United States Patent
Morita

(10) Patent No.: US 7,802,039 B2
(45) Date of Patent: Sep. 21, 2010

(54) MEMORY CONTROLLER, BUS SYSTEM, INTEGRATED CIRCUIT, AND CONTROL METHOD OF INTEGRATED CIRCUIT INCLUDING CONTROLLING FLOW OF DATA TO AND FROM MEMORY

(75) Inventor: Hiroshi Morita, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 0 days.

(21) Appl. No.: 12/216,967

(22) Filed: Jul. 14, 2008

(65) Prior Publication Data
US 2009/0024778 A1    Jan. 22, 2009

(30) Foreign Application Priority Data
Jul. 17, 2007 (JP) ............................. 2007-185362

(51) Int. Cl.
G06F 13/37 (2006.01)
(52) U.S. Cl. .................... 710/117; 710/110; 711/167
(58) Field of Classification Search ......... 710/104–105, 710/110–119, 309, 40–45, 240–244; 711/167–169
See application file for complete search history.

(56) References Cited

U.S. PATENT DOCUMENTS

| | | | | |
|---|---|---|---|---|
| 5,956,493 A | * | 9/1999 | Hewitt et al. | 710/113 |
| 6,704,821 B2 | * | 3/2004 | Scandurra et al. | 710/243 |
| 2005/0240707 A1 | * | 10/2005 | Hayashi et al. | 710/309 |
| 2007/0083865 A1 | * | 4/2007 | Hemmi | 718/100 |
| 2007/0283064 A1 | * | 12/2007 | Lai | 710/116 |
| 2008/0098145 A1 | * | 4/2008 | Yeh | 710/244 |
| 2008/0140980 A1 | * | 6/2008 | Mei et al. | 711/170 |
| 2008/0288731 A1 | * | 11/2008 | Izumi | 711/160 |
| 2009/0019238 A1 | * | 1/2009 | Allison et al. | 711/151 |
| 2009/0049256 A1 | * | 2/2009 | Hughes et al. | 711/158 |

FOREIGN PATENT DOCUMENTS

JP    9-259080    10/1997

OTHER PUBLICATIONS

"Prime Cell Dynamic Memory Controller (PL340) rOpO Technical Reference Manual Ref: DD10331C".

* cited by examiner

*Primary Examiner*—Raymond N Phan
(74) *Attorney, Agent, or Firm*—McGinn IP Law Group, PLLC

(57) ABSTRACT

An integrated circuit including: a bus system including a bus master connected to a bus; and a memory controller connected to the bus system and controlling a connection between the bus master and a memory, in which the bus system includes a counter counting a waiting time from a time the bus master outputs a memory access request until a time a connection between the bus master and the memory controller is established, and the memory controller controls a memory access based on the waiting time counted by the counter.

20 Claims, 4 Drawing Sheets

MEMORY CONTROLLER, BUS SYSTEM, INTEGRATED CIRCUIT, AND CONTROL METHOD OF INTEGRATED CIRCUIT INCLUDING CONTROLLING FLOW OF DATA TO AND FROM MEMORY

BACKGROUND OF THE INVENTION

1. Field of the Invention

This invention is related to a memory controller which controls the flow of data going to and from a main memory. This invention is related also to a bus system and an integrated circuit, which include the memory controller, and a control method of the integrated circuit.

2. Description of Related Art

A system scale in large scale integration (LSI) becomes larger, and a larger number of bus masters access a main memory through a bus path. There are some methods of connecting multiple bus masters to the main memory. One method is connecting multiple bus masters hierarchically. Another method is providing a larger number of input/output ports to the main memory and connecting the bus master with each input/output port of the main memory.

The memory controller gives the bus masters an access right to the memory and arbitrates memory access requests of the bus masters. This arbitration operation is performed so that the processing efficiency of data transfer from the bus master to the memory is maximized according to specifications and characteristics of the memory. In other words, the arbitration is operated so that the throughput is maximized. For example, the memory controller of Multibank Dynamic Random Access Memory (Multibank DRAM) manages the memory access requests REQ as a queue. The memory controller arbitrates the memory access requests so that memory operation switches between writing and reading operation with a minimum number of switching times. The arbitration is also performed so as to prevent memory bank conflicts. In this way, the arbitration of the memory controller enhances the processing efficiency of data transfer between the bus master and the memory.

When the LSI is mounted in an electrical device utilizing sound data, video data or the like, the transfer speed of the data processed by the LSI directly influences the usability for the users. In the memory controller of the LSI, when sound data and video data are transferred between the bus master and the memory, the delay time needs to be set within a predetermined time. The delay time means the waiting time for the bus master, which is from the time the bus master sends an access request REQ until the time the bus master actually transfers the data. Japanese Unexamined Patent Application Publication No. 9-259080 and "Prime Cell Dynamic Memory Controller (PL340) r0p0 Technical Reference Manual Ref: DD10331C", <URL: http://www.arm.com/products/solutions/PrimeCellMemCtrl.html> disclose the control method of the memory controller, in which a maximum delay time of data transfer is predetermined and the data is transferred within the maximum delay time.

Japanese Unexamined Patent Application Publication No. 9-259080 discloses that the maximum delay time is determined depending on the change in frequency of a bus between the sending side and the receiving side in order to set the optimum value of the maximum delay time. "Prime Cell Dynamic Memory Controller (PL340) r0p0 Technical Reference Manual Ref: DD10331C" discloses that the memory controller receives read access requests from the bus masters, expects a predicted maximum delay time of the bus, and determines the maximum delay time in consideration of the predicted maximum bus delay time. In the control method of the memory controller, when a read access cannot be executed within the maximum delay time, this read access is preferentially processed.

However, in the memory controller according to Japanese Unexamined Patent Application Publication No. 9-259080, when the plurality of bus masters request access memory, accesses are concentrated in the bus and a waiting time, which is from the time the bus master sends access request until the time the connection between the bus master and the memory controller is built is changed according to the busy condition of the bus. In the memory controller, the maximum delay time of data transfer is determined only based on a bus frequency and the busy condition is not considered at determining the maximum delay time. In the memory controller according to Japanese Unexamined Patent Application Publication No. 9-259080, there is a problem that the maximum delay time cannot be optimally determined for actual system condition.

In the control method of the memory controller according to "Prime Cell Dynamic Memory Controller (PL340) r0p0 Technical Reference Manual Ref: DD10331C", the maximum delay time for memory access is determined based on the maximum bus delay time. As a result, in the control method of the memory controller according to "Prime Cell Dynamic Memory Controller (PL340) r0p0 Technical Reference Manual Ref: DD10331C", the maximum delay time is set shorter than necessary. When the maximum delay time is set short, time out signals informing exceedance of the maximum delay time are frequently input to the arbiter. Commonly, the arbiter arbitrates the memory accesses so that the processing efficiency of data transfer from the bus master to the memory is maximal. However, when the time out signals are often input to the arbiter, arbitration for maximum processing efficiency is frequently interrupted. In the control method of the memory controller according to "Prime Cell Dynamic Memory Controller (PL340) r0p0 Technical Reference Manual Ref: DD10331C", there is a problem that processing efficiency of data transfer decreases caused by the time out signals inputted.

SUMMARY

According to one aspect of the present invention, there is provided an integrated circuit which provides a bus system connected to a bus master, and a memory controller connected to the bus system and controlling a connection between the bus master and a memory. The bus system includes a counter counting a waiting time from when the bus master requests memory access to when a connection between the bus master and the memory controller is built, and the memory controller controls memory access of the bus master based on the waiting time counted by the counter.

According to another aspect of the present invention, there is provided a bus system controlling a connection between a bus master and a memory and connected to a memory controller, the bus system including: a counter counting a waiting time from a time the bus master sends an access request, until a time a connection between the bus master and the memory controller is established.

According to another aspect of the present invention, there is provided a memory controller connected to a bus system including a plurality of buses connected to a bus master, the memory controller including: a latency control timer receiving a waiting time counted by the counter; and an arbiter determining a priority order of the bus master to access the memory.

According to another aspect of the present invention, there is provided a control method of an integrated circuit including a bus system providing a bus master connected to a bus, and a memory controller connected to the bus system and controlling a connection between the bus master and a memory, the control method comprising; counting a waiting time from a time the bus master sends an access request for the memory, until a time the connection between the bus master and the memory controller is established; and controlling a memory access of the bus master based on the counted waiting time.

In the integrated circuit according to the invention, processing efficiency of data transfer can be improved.

BRIEF DESCRIPTION OF THE DRAWINGS

The above and other objects, advantages and features of the present invention will be more apparent from description of certain preferred embodiments taken in conjunction with the accompanying, in which.

DETAILED DESCRIPTION OF THE PREFERRED EMBODIMENTS

The invention will now be described herein with reference to illustrative embodiments. Those skilled in the art will recognize that many alternative embodiments can be accomplished using the teachings of the present invention and that the invention is not limited to the embodiments illustrated for explanatory purposes.

Hereinafter, the preferable embodiments of this invention will be described with reference to the accompanying drawings.

First Embodiment

Figure 1:
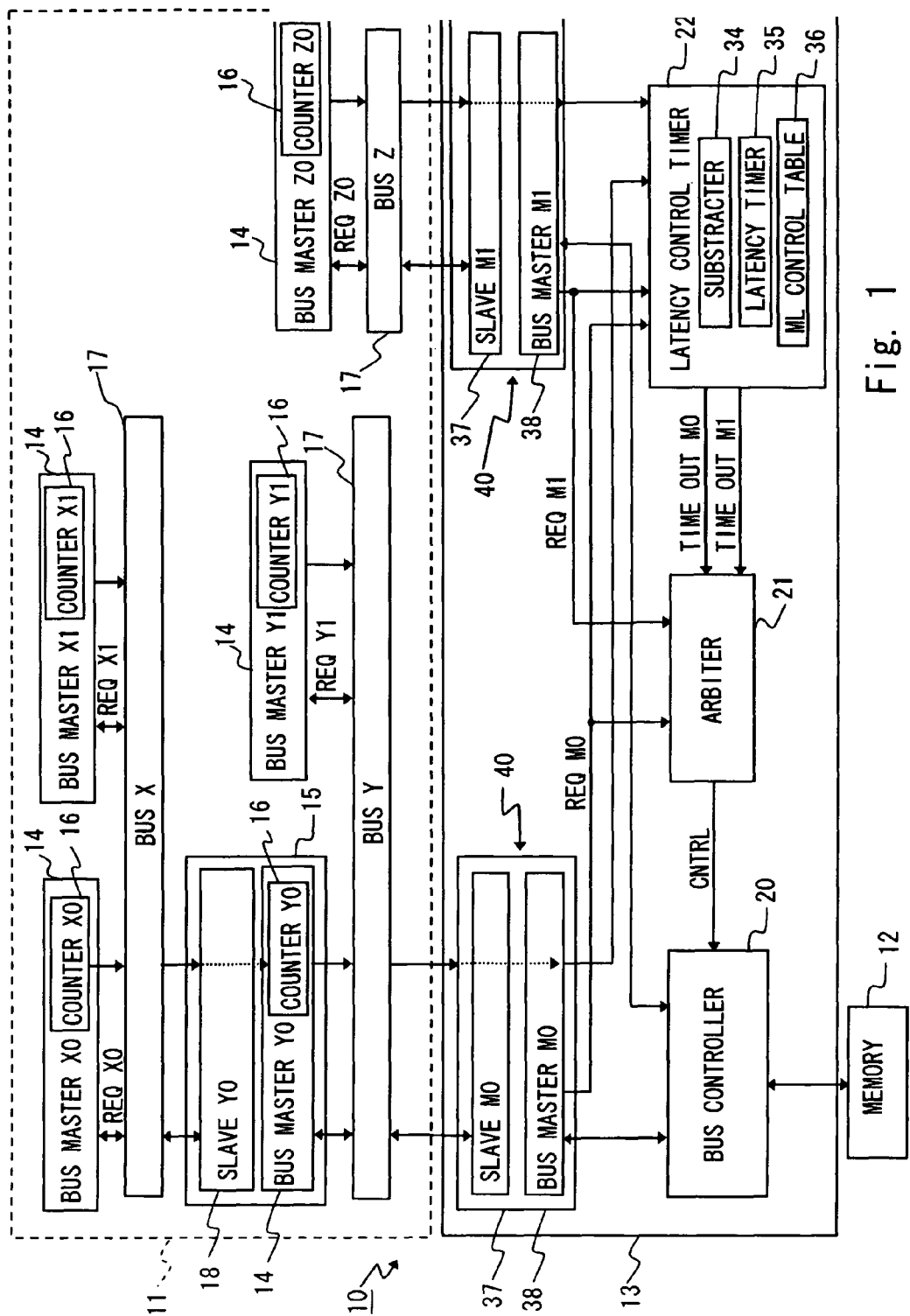
FIG. 1 is a block diagram of an integrated circuit according to a first embodiment.

FIG. 1 shows a block diagram of an integrated circuit according to the first embodiment. The integrated circuit 10 provides a bus system 11 including a bus connected to a bus master 14, a memory controller 13 connected to the bus system 11. The memory controller controls a connection between the bus master 14 and the memory 12. The bus system 11 includes a counter 16, which counts the waiting time T from the time the bus master 14 requests memory access until the time a connection between the bus master 14 and the memory controller 13 is established, and the memory controller 13, which controls a memory access of the bus master 14 based on the waiting time T counted by the counter 16.

One aspect of the integrated circuit according to the first embodiment is that the counters 16 is provided for the bus system 11, which counts the waiting time T from the time the bus master 14 sends the access request REQ until the time the connection between the bus masters 14 and the memory controller 13 is established. In consideration of the waiting time T, the memory controller 13 can determine a priority order of memory access which is given for the bus masters 14. As shown in FIG. 1, a plurality of counters 16 are provided on a connection path between the bus masters 14 and the memory 12. The plurality of counters 16 are collectively called the counter 16.

As shown in FIG. 1, the integrated circuit 10 includes the bus system 11, the memory 12 and the memory controller 13. The bus system 11 provides a plurality of buses 17 which are transmission paths for the data. All or a part of the buses 17 are hierarchically connected. In other words, the bus system 11 has multi-layer structure, in which layered buses are connected each other. As shown in FIG. 1, the bus system 14 has two tiers of the bus 17 at a maximum, but the number of layered buses is not limited.

The memory 12 is the main memory of the integrated circuit 10 which is Dynamic Random Access Memory (DRAM) or the like. The memory controller 13 receives the memory access requests REQ from the bus masters 14 which are connected to the bus 17, and overall controls the memory accesses of the bus masters 14.

The bus system 11 includes a plurality of buses 17. Hereinafter, each bus 17 is called the bus X, Y, Z in order to identify the buses. The bus X is connected to the bus Y through a bridge controller 15. The bus Y is connected to the bus X through the bridge controller 15 and to the memory controller 13. The bus Z is single layer bus which is not connected to other buses X and Y. The bus Z is directly connected to the memory controller 13.

The bus 17 is connected to the bus master 14 and a slave 18 which operates dependent on the operation of the bus master 14. The bus masters 14 connected to the buses Y, Z are called the bus masters Y0, Y1, Z0. The slaves 18 of the bus masters Y0, Y1, Z are called the slaves M0, M1, which are provided in the memory controller 13. When the bus master 14 which is upper tier of the bus system 11 sends the access request REQ, the slave 18 which is lower tier of the bus system 11 transmits the message of the access request REQ to the bus 17 and the bus masters 14 which are lower tier than the slave 18.

The bus masters X0 and X1 are connected to the bus X. The bridge controller 15 performing as the slave for the bus masters X0 and X1 is connected to the bus X. A slave Y0 is provided in the bridge controller 15 which performs as the slave for the bus masters X0 and X1. The bridge controller 15 and the bus master Y1 are connected to the bus Y. The memory controller 13 performing as the slave of the bridge controller 15 and the bus master Y1 is connected to the bus Y. The memory controller 13 provides the slave M0 performing as the slave for the bridge controller 15 and the bus master Y1. The bus master Z0 is connected to the bus Z. The memory controller performing as the slave for the bus master Z0 is connected to the bus Z. The memory controller 13 provides the slave M1 which performs as the slave for the bus master Z0.

Each bus master 14 provides the counter 16 which counts the waiting time T from the time the bus master 14 outputs the access request REQ to the bus 17 connected to the bus master 14, until the time the connection between the bus master 14 and the slave 18 is established. Hereinafter, the waiting time T from the time one component A outputs the access request REQ, until the time the connection between the component A and the component B is established is called the waiting time (the component A—the component B). The bus master X0 provides the counter X0 counting the waiting time T (the bus master X0—the bridge controller 15), which is from the time the bus master X0 outputs the access request REQ to the bus X, until the time the connection between the bus master X0 and the bridge controller 15 is established.

The bus master X1 provides the counter X1 counting the waiting time T (the bus master X1—the bridge controller 15). The bus master Y1 provides the counter Y1 counting the waiting time T (the bus master Y1—the memory controller 13). The bus master Z0 provides the counter Z0 counting the waiting time T (the bus master Z1—the memory controller 13).

When the connection between the bus master 14 and the bus 17 is established, the waiting time T counted by the counter 16 is transmitted to the slaves 18, 37, which are the destinations of the transferred data from the bus masters 14, 38. The slaves 18, 37 transfer the waiting time T to the lower tier of the bus masters 14, 38. For example, the waiting time T (the bus master X0—the bridge controller 15) counted by the counter X0 is transferred to the counter Y0 of the bus master Y0.

The waiting time T (the bus master Y1—the memory controller 13) or (the bus master Z0—the memory controller 13) of the bus master Y1 or Z0, which is connected to the memory controller 13 through one bus 17, is transferred to the memory controller 13. The counted value of the waiting time T is directly input to the latency control timer 22 in the memory controller 13. On the other hand, the waiting time T (the bus master X0—the bridge controller 15) or (the bus master X1—the bridge controller 15) of the bus master X0 or X1, which is connected to the memory controller 13 through the bus X, the bridge controller 15 and the bus Y, is transferred to the counter Y0 in the bridge controller 15.

The counter Y0 sets the counted value transferred from the counter X0, X1 to default value and begins to count from the default value until the connection between the bus controller 15 and the memory controller 13 is established. The value counted by the counter Y0 is transferred to the memory controller 13. The counted value is transferred to the latency control timer 22 of the memory controller 13.

Figure 2:
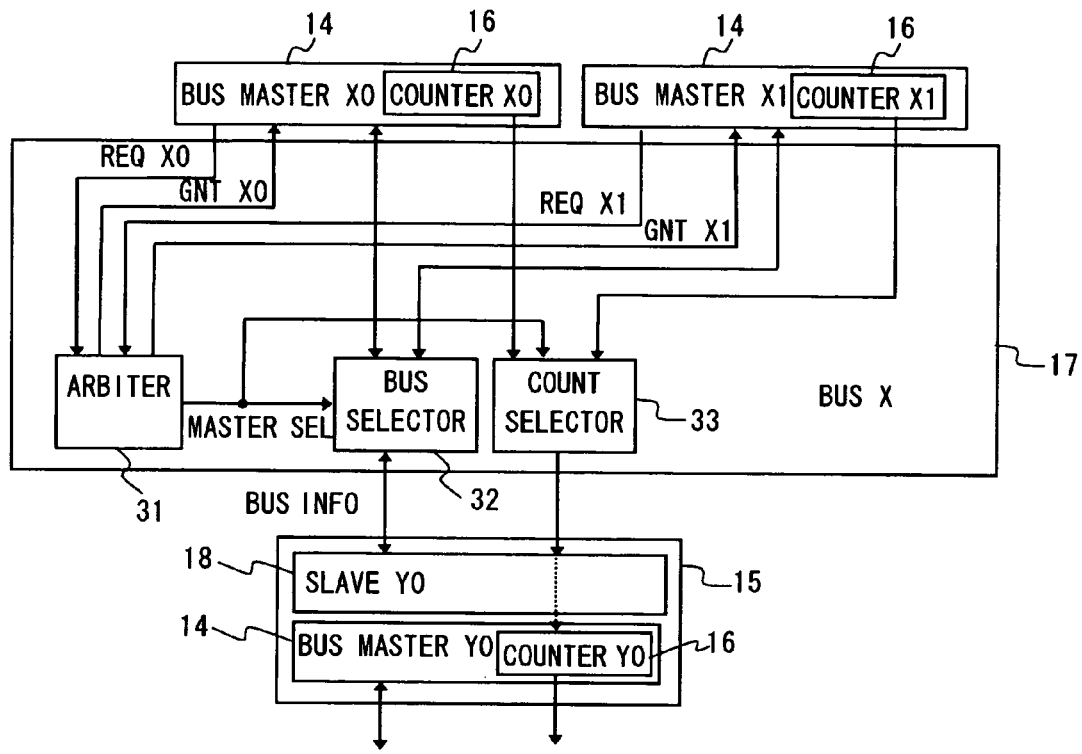
FIG. 2 is a block diagram of a bus of the integrated circuit according to the first embodiment.

FIG. 2 shows a block diagram of the bus 17. Taking the bus X for instance, composition of the bus 17 will be described with reference of FIG. 2. The bus X provides an arbiter 31, a bus selector 32 and a count selector 33. As described above, the bus masters X0, X1 are connected to the upper tier of the bus X and the bridge controller 15 is connected to the lower tier of the bus X. The waiting time T (the bus master X0—the bridge controller 15) counted by the counter X0 is input to the count selector 33.

The arbiter 31 receives the access requests REQ X0 and REQ X1 from the bus masters X0, X1 and sets a priority order for the access requests REQ X0, REQ X1. The bus selector 32 transfers the bus information BUS INFO of X0 or X1 to the slave Y0 based on the select signal MASTER SEL input from the arbiter 31. The bus selector 32 sets the connection between selected bus master X0 or X1 and the slave Y0 to be established. The bus information BUS INFO includes the descriptions of the bus cycle, a memory addresses to which the bus master 14 accesses, the transferred data or the like.

The count selector 33 outputs the count value, which is held in the counter X0 of the bus master X0 or the counter X1 of the bus master X1, to the counter Y0 according to the select signal MASTER SEL input from the arbiter 31. The count value held in the counter X0 or X1 is the waiting time T (the bus master X0—the bridge controller 15) or the waiting time T (the bus master X1—the bridge controller 15).

In the bus X configured as described above, when the access requests REQ X0, REQ X1 are input to the arbiter 31, the arbiter 31 chooses the bus master X0 or X1 to which the bus citizenship is given based on the known control method for the arbitration. The arbiter 31 sends the use permission signal GNT to the selected bus master X0 or X1.

For example, when the arbiter 31 selects the bus master X0, the use permission signal GNT X0 is output to the bus master X0. At this time, the arbiter 31 outputs the select signal MASTER SEL, which shows the selection of the bus master X0, to the bus selector 32 and the count selector 33. The bus selector 32 transfers the bus information BUS INFO (X0) corresponding to the selected bus master X0 to the slave Y0 based on the select signal MASTER SEL input from the arbiter 31. In this way, the connection between the bus master X0 selected by the arbiter 31 and the bridge controller 15 (the slave Y0) is built.

The count selector 33 outputs the waiting time T (the bus master X0—the bridge controller 15) of the selected bus master X0 to the slave Y0 based on the select signal MASTER SEL input from the arbiter 31. The slave Y0 receives the bus information BUS INFO (X0) from the bus selector 32 and holds it. The slave Y0 transfers the held bus information BUS INFO (X0) to the bus master Y0 connected directly to the slave Y0. The slave Y0 outputs the waiting time T (the bus master X0—the bridge controller 15) received from the count selector 33 to the counter Y0 of the bus master Y0.

The counter Y0 sets this value to default value. The counter Y0 begins to count up from the waiting time T (the bus master X0—the bridge controller 15) as a default value, until the connection between the bus master Y0 and the memory controller 13 (see FIG. 1) is established. In other words, the counter Y0 adds on the waiting time T (the bridge controller 15—the memory controller 13) to the waiting time T (the bus master X0—the bridge controller 15), which is input as the default. The count value held in the counter Y0 is the waiting time T (the bus master X0—the memory controller 13) from the time the bus master X0 outputs the access request REQ until the time the connection between the bus master X0 and the memory controller 13 is established.

After that, back to FIG. 1, when the connection between the bridge controller 15 and the memory controller 13 is built, the waiting time T (the bus master X0—the bridge controller 15) or (the bus master X1—the bridge controller 15), which is counted by the counter Y0, is output to the memory controller 13. The memory controller 13 receives the waiting time T (the bus master 14—the memory controller 13) from the time each interface 40 outputs the access request REQ, until the time the connection between the interface 40 and the memory controller 13 is built.

In the first embodiment described above, the count value Y0 counted by the counter Y0 is simply sum of the waiting time T (the bus master X0—the bridge controller 15) and the waiting time T (the bridge controller 15—the memory controller 13). However, other arithmetic processing can be used to get the waiting time T (the bus master 14—the memory controller 13) which is the latency time to establish the connection between the bus master 14 and the memory controller 13.

The count value input to the memory controller 13 is input to the latency control timer 22. Finally, the latency control timer 22 holds the waiting time T (the bus master 14—the memory controller 13) from the time each bus master 14 outputs the access request REQ until the time the connection between the bus master 14 and the memory controller 13 is established. The latency control timer 22 holds accumulated value of the waiting times T, which are counted by the bus 17 and the slave 18, which are the connection paths between the bus master 14 and the memory controller 13.

As shown in FIG. 1, the memory controller 13 includes the bus interfaces 40 connected to the buses Y, Z, the bus controller 20 controlling the connection between the bus interface 40 and the memory 12, and the latency control timer 22 controlling the information of the waiting time T. The memory controller 13 provides an arbiter 21 setting the priority order for memory accesses of the bus master 14, of which connection to the bus interface 40 is already built. The bus interface 40 is connection port to which the bus 17 is connected. The bus interface 40 is connected to the bus system 11, and provides a slave 37 performing as a slave for the bus 17 and the bus master 38 performing as a master of the bus controller 20. The bus interface 40 connected to the bus Y provides the slave M0 and the bus master M0. The bus interface 40 connected to the bus Z provides the slave M1, the bus master M1.

The arbiter 21 receives the access requests REQ M0 and REQ M1 from the bus masters M0 and M1. The arbiter 21 gives the priority order for the bus masters M0, M1, which send the access requests REQ M0 and REQ M1, based on the predetermined control method for the arbitration. The arbiter 21 outputs a control signal CNT1 to the bus controller 20 according to the priority order. The bus controller 20 selects one of the bus interfaces 40 based on the priority order and sets the connection between the selected bus interface 40 and the memory 12 to be established.

The latency control timer 22 provides a max latency control table (ML control table) 36, a subtracter 34, and a latency timer 35. The ML control table 36 memories the predetermined maximum latency ML of the data transfer corresponding to the bus interface 40. The subtracter 34 determines a data transfer compensation time DT based on the maximum latency ML and the waiting time T, which is the limit count for the bus master to transfer the data. The latency timer 35 controls the data transfer compensation time DT. The control table 36 stores the maximum latency ML for each bus interface 40. The maximum latency ML is constant value and doesn't depend on the bus condition. For example, the maximum latency ML (M0) is set for the bus interface 40 connected to the bus Y and the maximum latency ML (M1) is set for the bus interface connected to the bus Z.

The maximum latency ML can be controlled with respect to each bus master 14. If this is the case, it is only necessary to attach the identify information of the bus master 14 to the bus information BUS INFO or the access request. In this way, the memory controller 13 knows which bus master 14 corresponds to the count value received in the latency timer 22.

The latency timer 22 receives the waiting time T (the bus master 14—the memory controller 13), and calculates the data transfer compensation time DT based on the predetermined maximum latency ML for each bus interface 40 and the waiting time T (the bus master 14—the memory controller 13). The maximum latency ML minus the waiting time T (the bus master 14—the memory controller 13) is the data transfer compensation time DT. When the data cannot be transferred within the calculated data transfer compensation time DT, the latency control timer 22 outputs the time out signal TIME OUT to the arbiter 21.

Figure 3:
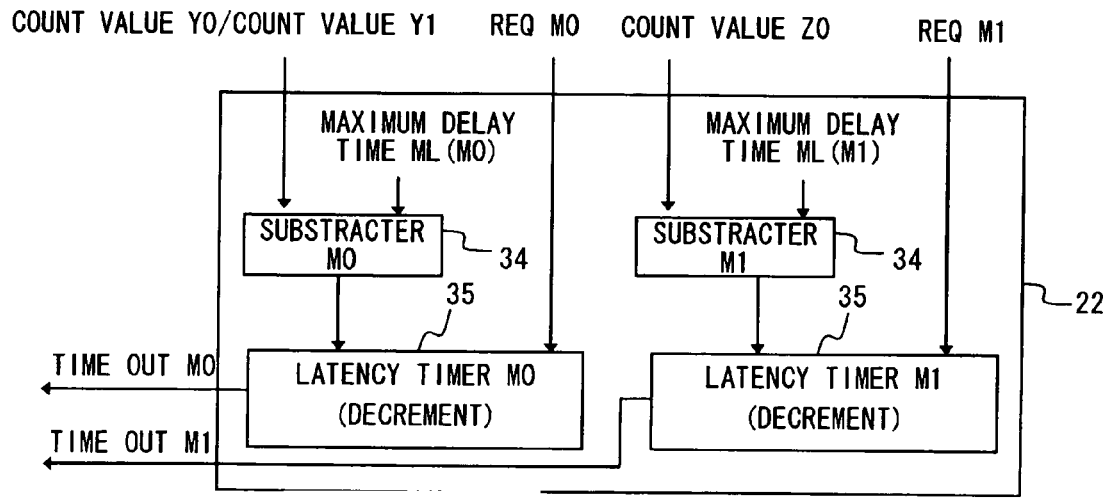
FIG. 3 is a block diagram of a latency control timer according to the first embodiment.

FIG. 3 shows a block diagram of the latency control timer 22. As described above, the latency control timer 22 provides the ML control table 36 (not shown in FIG. 3), the subtracter 34, and the latency timer 35. The subtracter 34 and the latency timer 35 are provided with respect to each bus interface 40. In other words, the subtracter 34 and the latency timer 35 are provided for each bus master 14, of which connection to the memory controller is built. Hereinafter, the subtracter 34 and the latency timer 35 of the bus interface 40, which is connected to the bus Y, are called the subtracter M0 and the latency timer M0 and the subtracter 34 and the latency timer 35 of the bus interface 40, which is connected to the bus Z, are called the subtracter M1 and the latency timer M1. The subtracter M0 receives the count value Y0 or Y1 counted by the counter Y0 or Y1 which is connected to the bus Y. On the other hand, the subtracter M1 receives the count value Z0 counted by the counter Z0 connected to the bus Z. For instance, the case the subtracter M0 receives the count value Y0 counted by the counter Y0 connected to the bus Y will be described.

The subtracter M0 receives the waiting time T (the bus master 14—the memory controller 13) from the counter Y0, and the maximum latency ML (M0), which is predetermined for the bus interface 40 (M0), from the ML control table 36. For example, when the connection between the bus master X0 and the memory controller is built, the waiting time T (the bus master X0—the memory controller 13) as the count value Y0 is input to the subtracter M0. The subtracter M0 subtracts the waiting time T (the bus master M0—the memory controller 13) from the maximum latency ML (X0), and outputs the calculated value to the latency timer M0.

When the access request REQ (M0) from the bus master M0 becomes active, the latency timer M0 retrieves the output of the subtracter M0. At this time, when the retrieved output of the subtracter M0 is 0 or less than 0, the latency timer M0 outputs the time out signal TIME OUT which represents that the waiting time T (the bus master X0—the memory controller 13) of the bus master X0 runs over the maximum latency ML to the arbiter 21. On the other hand, when the retrieved output of the subtracter M0 is more than 0, the latency timer M0 sets the retrieved output to the default value, and begins to decrement the default value. When the decremented value becomes 0, the latency timer M0 outputs the time out signal TIME OUT (M0) to the arbiter 21.

As shown in FIG. 1, when the arbiter 21 receives the time out signal TIME OUT (M0), the arbiter 21 knows the data cannot be transferred between the bus master 14 and the memory 12, and the waiting time T of the bus master, of which connection between the bus master M0 is built, exceeds the predetermined maximum latency ML. The arbiter 21 makes the priority order of the bus master M0 higher, based on the time out signal TIME OUT (M0). The arbiter 21 outputs the control signal CNTL to the bus controller 20 so that this bus master M0 is connected preferentially to the memory 12. In this way, the connection between the bus master M0 and the memory is established.

For example, when the connection between the bus master X0 and the bus master M0 is established, and the latency control timer 22 outputs the time out signal TIME OUT (M0) to the arbiter 21, the arbiter 21 makes the priority order of the bus master M0 higher and outputs the control signal to the bus controller 20. The bus controller 20 sets the connection between the bus master M0 and the memory 12 to be established based on the control signal CNTL. In this way, the bus master X0 connected to the bus master M0 can access to the memory 12.

Figure 4:
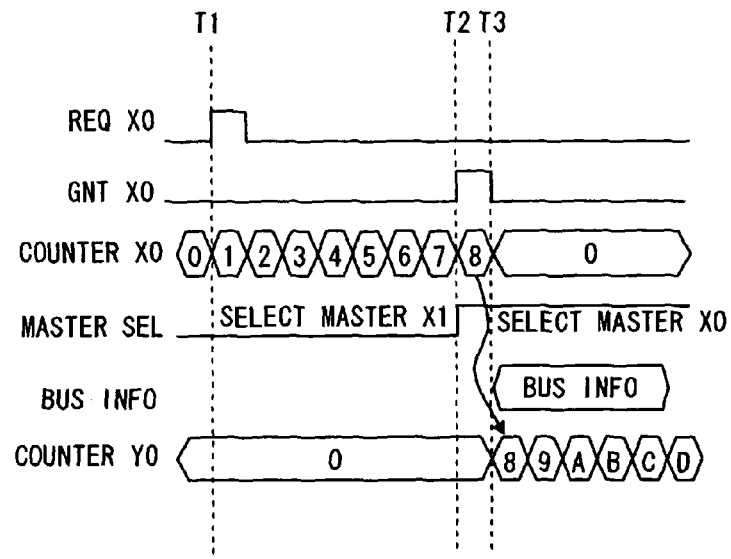
FIG. 4 is a timing chart showing operation of the integrated circuit according to the first embodiment.

Hereinafter, the detailed operations of the integrated circuit 10 will be described. FIG. 4 shows a timing chart representing operations of each component of the integrated circuit 10 in FIG. 2. FIG. 4 shows operations of each component on the access path between the bus master X0 and the slave Y0, when the bus master X0 transfers the access request (X0).

The bus master X0 transfers the access request REQ to the bus X for memory access at the time t1. The counter X0 of the bus master X0 begins to count at the time t1, when the access request REQ turns active. The arbiter 31 performs the arbitration and makes the use permission signal GNT (X0) active at the time t2 so as to give the use permission for the bus master X0. At the same time of the time t2, the arbiter 31 of the bus X outputs the select signal MASTER SEL, which represents the bus master X0 is selected, to the bus selector 32 and the count selector 33. For example, when the bus master X1 is selected, the select signal MASTER SEL is set to be low level. On the other hand, when the bus master X0 is selected, the select signal MASTER SEL is set to be high level as shown in FIG. 4.

The counter X0 stops counting at the time the use permission signal GNT (X0) becomes active and holds the counted value (8). In FIG. 4, the counter X0 stops counting at the time t3, which is the falling edge of the use permission signal GNT (X0), and keeps the count value (8). The count value (8) corresponds to the waiting time T (the bus master X0—the memory controller 13) from the time the bus master X0 transfers the access request REQ, until the time the connection between the bus master X0 and the bridge controller 15 is established.

When the use permission signal GNT (X0) becomes active, the bus master X0 produces the bus cycle in the slave Y0, and outputs the bus information BUS INFO (X0) through the bus selector X to the slave Y0. At this time, when the use permission signal GNT (X0) becomes active, the bus master X0 outputs the count value (8) kept in the counter X0 to the counter Y0 through the count selector 33. The counter Y0 sets the waiting time T (the bus master X0—the memory controller 13) counted by the counter X0 to the default value, and begins to count. In other words, the counter Y0 sets the default value to 8 and begins to count from the default value (8) at the time t3.

In the same way, the counters 16, which is located on the access path between the bus master X0 and the memory controller 13, accumulates the waiting time T (the bus master X0—the component) from the time the bus master X0 sends the access request REQ, until the connection between the bus master X0 and the component is established. With the reference to FIG. 1, the counter Y0 begins to count up the count value (8) transferred from the counter X0. When the connection between the bus master Y0 and the slave M0 is established, the counter Y0 outputs the count value Y0 to the latency control timer 22. The count value of 8 kept in the counter Y0 represents the waiting time T (the bus master X0—the memory controller 13) from the time the bus master X0 transfers the access request REQ to the bus X, until the time the connection between the bus master X0 and the memory controller 13 is established.

When the use permission signal GNT (Y0) becomes active, which is input from the bus Y, the counter Y0 outputs the held count value to the latency control timer 22 through the bus Y. In this way, the memory controller 13 receives the waiting time T (the bus master X0—the memory controller 13) from the time the bus master X0 outputs the access request REQ, until the time the connection between the bus master X0 and the memory controller 13 is established. The latency control timer 22 of the memory controller 13 retrieves the waiting time T (the bus master X0—the memory controller 13) at the time the bus master M0 outputs the access request REQ (M0) to the latency control timer 22.

The latency timer 22 subtracts the waiting time T (the bus master X0—the memory controller 13) from the predetermined maximum latency ML (M0) using the subtracter 34. The latency timer 35 sets the calculated value to the default value by the subtracter 34 and begins to decrement the default value. When the bus master X0 cannot access the memory 12 before the held value becomes 0, the latency timer 35 outputs the time out signal TIME OUT (M0) to the arbiter 21.

When the arbiter 21 receives the time out signal TIME OUT (M0) from the latency control timer 22, the arbiter 21 changes the priority order of the memory access request M0 of the bus master M0 higher. The arbiter 21 outputs the control signal CNTL to the bus controller 20 according to the changed priority order. The bus controller 20 sets the connection between the bus master M0 and the memory 12 to be established based on the control signal CNTL. In this way, the connection between the bus master X0 and the memory 12 is built, and the data is transferred between the bus master X0 and the memory 12.

In the same way, with accumulating the waiting time by the scattered counters on the connection path, the waiting time T (the bus master 14—the memory controller 13) are counted, which is from the time the bus master transfers the access request, until the time the connection between the bus master 14 (the bus master X1, Y0, Y1, Z0) and the memory controller 13 is established.

The waiting time T (the bus master 14—the memory controller 13) of each bus master 14 is transferred to the latency control timer 22 in the memory controller 13. The latency timer 22 subtracts the waiting time T (the bus master 14—the memory controller 13), which is changed according to the bus usage condition, from the maximum latency ML, which is independent from the bus usage condition. The latency timer 22 begins to decrement the subtracted value using the latency timer 35. If the bus master 14 cannot finish transferring the data before the count value kept by the latency timer 35 becomes 0, the latency timer 35 outputs the time out signal TIME OUT to the arbiter 21 when the kept value becomes 0.

In the integrated circuit 10 configured as described above, the plurality of counters are provided on the connection path between each bus master 14 and the memory controller 13, and the scattered counters count the accumulated waiting time T between the components. In this way, the waiting time T (the bus master 14—the memory controller 13) from the time the bus master 14 transfers the access request REQ, until the connection between the bus master 14 and the memory controller 13 is built, can be obtained.

The latency control timer 22 subtracts the waiting time T (the bus master 14—the memory controller 13) from the predetermined maximum latency ML with using the subtracter 34, and determines the data transfer compensation time DT, which is the remaining time of transfer data. This enables the data transfer compensation time DT to be set to the optimal value according to the usage condition of the bus. The latency timer 35 counts down the elapsed time from the data transfer compensation time DT of the remaining time. In this way, the waiting time of the bus master 14, which is the remaining time after the connection between the bus master 14 and the memory controller 13 is established, can be counted.

The arbiter 21 usually performs the arbitration so that the processing efficiency of data transfer is made maximum. When the arbiter 21 receives the time out signals TIME OUT or the like, the arbitration operation is interrupted and the processing efficiency of data transfer becomes lower. On the other hand, in this embodiment, only when the waiting time of the bus master 14 passed over the maximum latency ML, the latency control timer 22 outputs the time out signal TIME OUT to the arbiter 21. This enables the number of inputting the time out signal TIME OUT, which interrupts the arbitration of the arbiter 21, to be made minimum.

When the bus master 14 cannot transfer the data even when the maximum latency ML has been exceeded, the latency timer 22 outputs the time out signal TIME OUT to the arbiter 21. This enables the maximum latency ML for each bus master 14 to be compensated. In other words, in this embodiment, the maximum latency ML corresponding to each bus master 14 can be compensated and the peak processing efficiency of data transfer in the arbiter 21 can be obtained. In the integrated circuit 10, both the compensation of the data transfer and the advancement of the throughput can be obtained with promotion of the performing efficiency.

Second Embodiment

Figure 5:
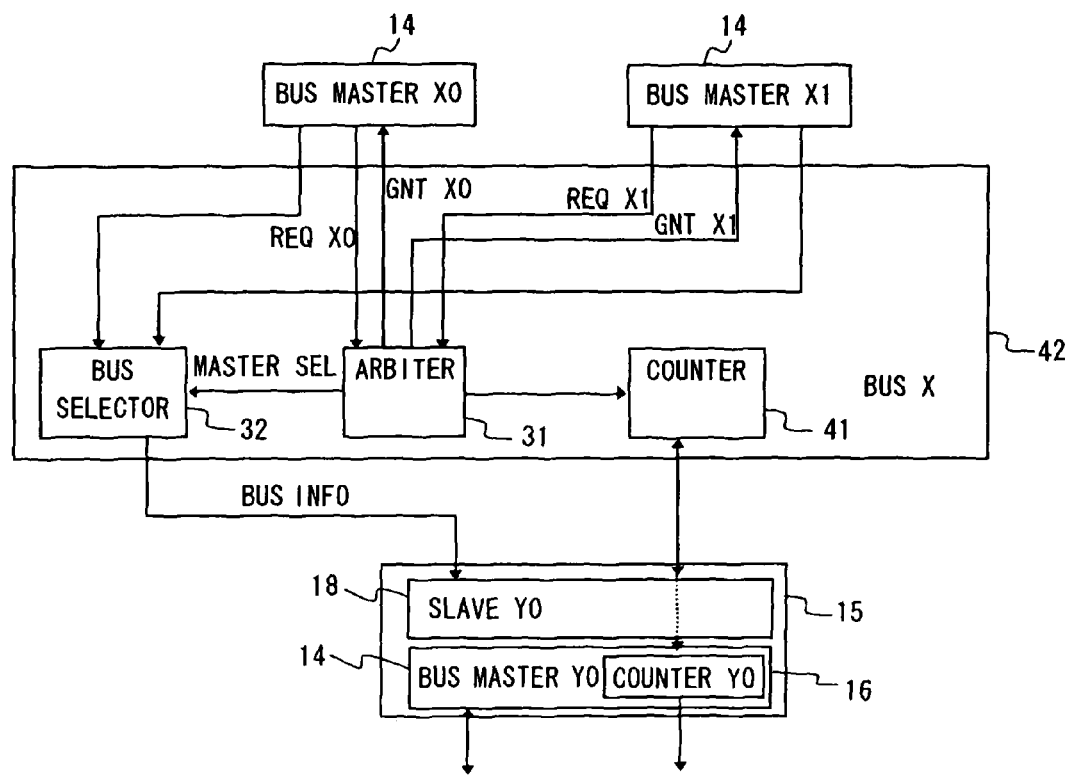
FIG. 5 is a block diagram of a bus of the integrated circuit according to a second embodiment.

One aspect of the second embodiment is that the counter 41 is provided in the bus 17, and the counter 41 counts the waiting time T (the bus master 14—the bridge controller 15) or (the bus master 14—the memory controller 13) from the time the bus master 14 transfers the access request REQ, until the time the connection between the bus master 14 and the bridge controller 15 or the memory controller as the slave is established. In the first embodiment, the counter 16 is provided in the bus master 14, but in the second embodiment, the counter 41 is provided in the bus 17, which counts the waiting time T (the bus master 14—the bridge controller 15) and (the bus master 14—the memory controller 13). FIG. 5 shows a block diagram of the bus 42 in the integrated circuit according to the second embodiment. The bus 42 in FIG. 5 corresponds to the bus 17 in FIG. 2. All the configurations in the second embodiment are same as those of the first embodiment in FIG. 1 except around the counter 41. The same components as those of the first embodiment are denoted by identical reference numerals there of is omitted.

As shown in FIG. 5, in the bus 42 of the integrated circuit according to the second embodiment, the counter 41 is connected to the arbiter 31. Taking the bus X for instance, the configuration of the bus 42 will be described. When the bus master X0 or X1 transfers the access request REQ to the bus X, the counter 41 counts the waiting time T (the bus master X0—the bridge controller 15) or (the bus master X1—the bridge controller 15) from the time the bus master X0 or X1 transfers the access request REQ, until the time the connection between the bus master 14 and the bridge controller 15 is established.

For example, when both the bus masters X0 and X1 output the access requests REQ (X0) and REQ (X1) to the bus X, the counter 41 counts both the waiting time T (the bus master X0—the bridge controller 15) of the bus master X0 and the waiting time T (the bus master X1—the bridge controller 15) of the bus master X1. The arbiter 31 decides which bus master X0 or X1 is connected to the bridge controller 15, based on the predetermined control method for the arbitration. The arbiter 31 sends the use permission signal GNT (X0) or GNT (X1) for the selected bus master X0 or X1 and gives the bus citizenship of the bus X. In this way, the connection between the bus master X0 or X1 and the bridge controller 15 is established. The configurations and the operations are almost the same as those of the first embodiment except for counting the waiting time T (the bus master 14 and the bridge controller 15).

In the second embodiment, the counter 41 provided in the bus 42 counts the waiting time T (the bus master 14—the bridge controller 15) and (the bus master 14 and the memory controller 13) of the bus master 14 connected to the bus X. This enables the waiting times T of the bus masters which are connected to one bus 17, are counted by just one counter 41. In the integrated circuit according to the second embodiment, the counter 41 of the bus 42 counts the waiting time T, and the existing bus master 14 which does not include the counter 16 can be connected to the memory controller 13. In this way, even when the existing bus master is connected to the memory controller, the data transfer compensation time DT can be set to the optimal value and the maximum latency ML can be compensated according to the usage condition of the bus.

In the first and the second embodiments, when the bus system 11 provides two or more tires of the buses, it is only necessary to provide the counters for every tire, and pass the count value of the upper tire to the counter of the lower tire. In this way, if the integrated circuit includes two or more tires of buses, the memory controller 13 can know the waiting time T (the bus master 14—the memory controller 13) from the time the bus master 14 transfers the access request, until the time the connection between the bus master 14 and the memory controller 13 is established.

The counter 16 does not need to be provided on all the connection paths. The counters 16 can be provided to the preferable positions. The counter 16 provided in each bus master 14 of the first embodiment and the counter 41 in the bus 42 of the second embodiment can be provided together in one bus system 11.

At determining the data transfer compensation time DT, there is no need to subtract the waiting time T (the bus master 14—the memory controller 13) from the maximum latency ML. The latency timer 22 can use other arithmetic processings according to the system, and may determine the data transfer compensation time DT based on the waiting time T (the bus master 14—the memory controller 13).

Third Embodiment

Figure 6:
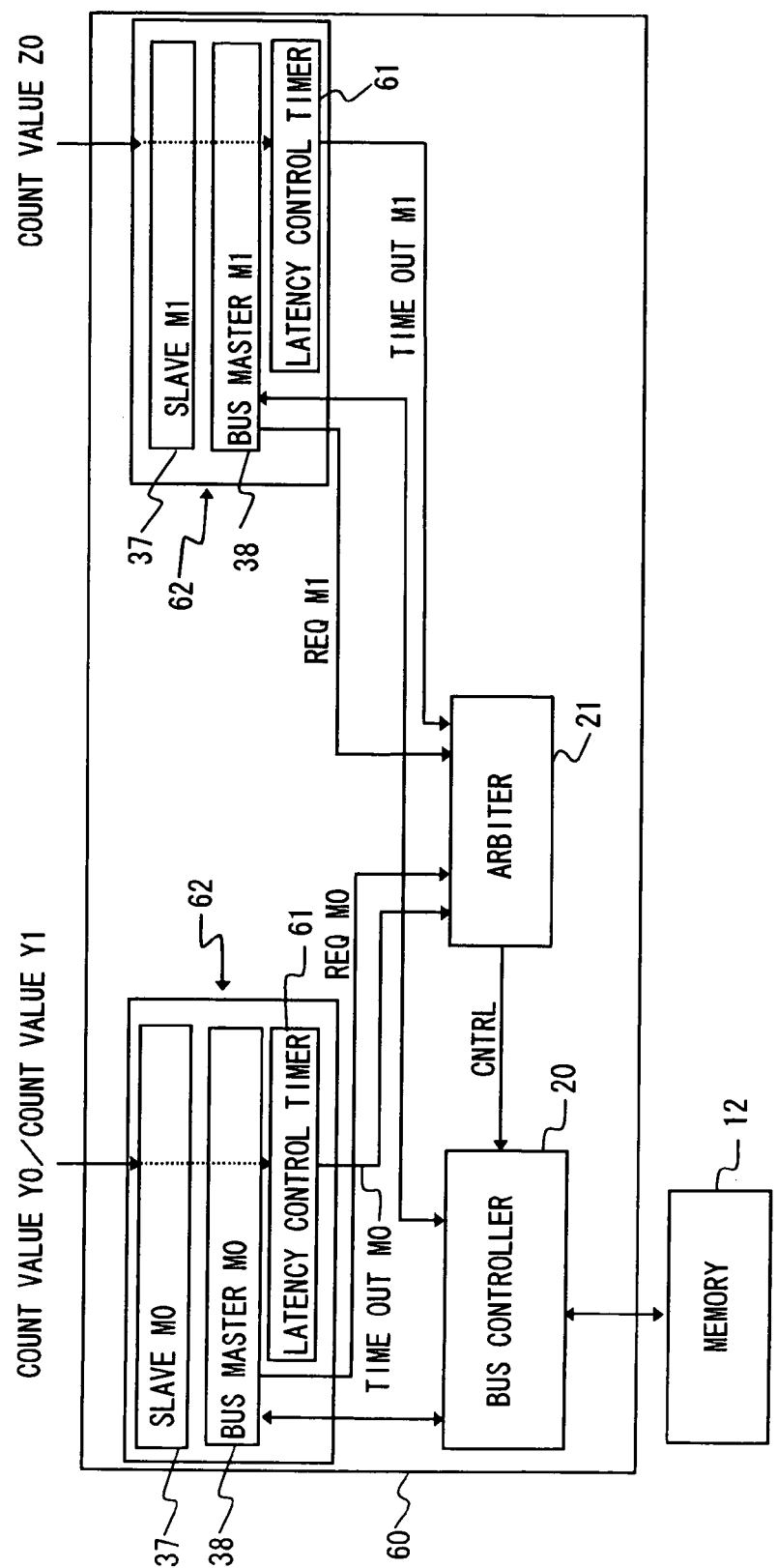
FIG. 6 is a block diagram of a memory controller of the integrated circuit according to a third embodiment.

FIG. 6 shows a block diagram of a memory controller 60 in the integrated circuit according to the third embodiment. One aspect of the third embodiment is that a latency control timer 61 is provided for each bus interface 62. As same as in the first embodiment, the latency control timer 61 provides the subtracter 34, the ML control table 36, and the latency timer 35, and the data transfer compensation time DT is controlled with respect to each bus interface 62. The other configurations are almost the same as those of the first embodiment. The same components are denoted by identical reference numerals, and explanation thereof is omitted.

In the integrated circuit configured as described above, the count values Y0 and Y1 counted by the counters Y0 and Y1 (not shown) are input to the latency control timer M0. The latency control timer M0 subtracts the received count value Y0 (or Y1) from the maximum latency ML (M0) predetermined for the bus interface 62 (M0), and sets the subtracted value to the data transfer compensation time DT. The latency control timer M0 outputs the time out signal TIME OUT (M0) to the arbiter 21 at exceeding the data transfer compensation time DT.

In the same way, the bus interface (M1) connected to the bus Z receives the count value Z0 counted by the counter Z0. The latency control timer M1 subtracts the count value Z0 from the maximum latency ML (M1) predetermined for the bus interface (M1) and sets the calculated value to the data transfer compensation time DT. If the bus master cannot transfer the data within the data transfer compensation time DT, the latency control timer M1 outputs the time out signal TIME OUT (M1) to the arbiter 21.

In the drawing, the latency control timer 61 is provided in the bus interface 62. However, as long as the latency control timer 61 is provided for each bus interface 62, the latency control timer 61 can be provided outside of the bus interface 62.

It is apparent that the present invention is not limited to the above embodiments, but may be modified and changed without departing from the scope and spirit of the invention.

What is claimed is:

1. An integrated circuit comprising:
a bus system including a bus master connected to a bus; and
a memory controller connected to the bus system, and controlling a connection between the bus master and a memory,
wherein the bus system comprises a counter counting a waiting time from a time the bus master outputs a memory access request until a time a connection between the bus master and the memory controller is established, and
wherein the memory controller controls a memory access based on the waiting time counted by the counter.

2. The integrated circuit according to claim 1,
wherein the counter is provided for each bus master.

3. The integrated circuit according to claim 1,
wherein the bus system includes:
a first bus and a second bus connected hierarchically; and
a bridge controller between the first bus and the second bus, the bridge controller controlling the connection between the first bus and the second bus,
the bus master connected to the first bus is connected to the memory controller through the first bus and the second bus, and
the counter includes:
a first counter counting a time from the time the bus master connected to the first bus sends the access request, until the time a connection between the bus master and the bridge controller through the first bus is established; and
a second counter retrieving a count value held by the first counter as a default value, and counting from the time a connection between the bus master connected to the first bus and the bridge controller is established, until the time a connection between the bridge controller and the memory controller connected to the second bus is established.

4. The integrated circuit according to claim 1,
wherein the memory controller includes:
a latency control timer receiving the waiting time counted by the counter; and
an arbiter determining a priority order of the bus master to access the memory, and the latency control timer includes:
an arithmetic circuit determining a data transfer compensation time, which is a time limit of data transfer performed by the bus master, based on a predetermined maximum latency of data transfer memorized in a maximum latency control table and the count value counted by the counter; and
a latency timer outputting a control signal to the arbiter when the waiting time of the bus master exceeeds the data transfer compensation time, so that the priority order of the bus master passed over the data transfer compensation time is changed to be higher.

5. The integrated circuit according to claim 1, wherein the memory controller receives the counted waiting time from the bus system to generate a data transfer compensation time indicating a time limit of data transfer performed by the bus master, and controls a memory access based on the data transfer compensation time.

6. The bus system according to claim 1, further comprising an arbiter receiving the memory access request, and outputting a bus use permission signal based on a priority order, the bus use permission signal permitting a use of the bus by the bus master,
wherein the counter outputs a bus latency time when the counter receives a signal corresponding to the bus use permission signal, and
wherein the waiting time comprises the bus latency time.

7. The integrated circuit according to claim 3,
wherein the second bus provides a hierarchic structure in which a plurality of buses are connected hierarchically, and
the second counter is a counter group including a plurality of counters which are provided hierarchically, and accumulates the count value.

8. The integrated circuit according to claim 3,
wherein at least one of the first counter and the second counter is provided in the bus master.

9. The integrated circuit according to claim 3,
wherein the first counter is provided in the first bus and/or the second counter is provided in the second bus.

10. The integrated circuit according to claim 4,
wherein the maximum latency control table keeps the maximum latency corresponding to each bus interface connected to the bus.

11. The integrated circuit according to claim 5, further comprising a latency timer receiving the data transfer compensation time and the memory access request, setting the data transfer compensation time as a default value, and starting to count down from the default value in response to the memory access request,
wherein the memory controller preferentially establishes a connection between the bus master and the memory when a count value counted by the latency timer becomes 0.

12. A bus system controlling a connection between a bus master and a memory and connected to a memory controller, the bus system comprising:
a counter counting a waiting time from a time the bus master sends an access request, until a time a connection between the bus master and the memory controller is established,
wherein the bus system includes:
a first bus and a second bus connected hierarchically; and
a bridge controller between the first bus and the second bus, the bridge controller controlling a connection between the first bus and the second bus,
the bus master connected to the first bus is connected to the memory controller through the first bus and the second bus, and
the counter comprises:
a first counter counting a time from the time the bus master connected to the first bus sends the access request, until the time a connection between the bus master and the bridge controller through the first bus is established; and
a second counter retrieving a count value held by the first counter as a default value, and counting from the time a connection between the bus master connected to the first bus and the bridge controller is established, until the time a connection between the bridge controller and the memory controller connected to the second bus is established.

13. The bus system according to claim 12,
wherein the bus system includes:
a first bus and a second bus connected hierarchically; and
a bridge controller between the first bus and the second bus, the bridge controller controlling a connection between the first bus and the second bus,
the bus master connected to the first bus is connected to the memory controller through the first bus and the second bus, and the counter includes:
a first counter counting a time from the time the bus master connected to the first bus sends the access request, until the time a connection between the bus master and the bridge controller through the first bus is established; and
a second counter retrieving a count value held by the first counter as a default value, and counting from the time a connection between the bus master connected to the first bus and the bridge controller is established, until the time a connection between the bridge controller and the memory controller connected to the second bus is established.

14. A memory controller, connected to a bus system including a plurality of buses connected to a bus master, the memory controller comprising:
a latency control timer receiving a waiting time counted by a counter; and
an arbiter determining a priority order of the bus master to access the memory, wherein the latency control timer comprises:
an arithmetic circuit determining a data transfer compensation time, which is a time limit of data transfer performed by the bus master, based on a predetermined maximum latency of data transfer memorized in a maximum latency control table and the count value counted by the counter; and
a latency timer outputting a control signal to the arbiter when the waiting time of the bus master exceeds the data transfer compensation time, so that the priority order of the bus master passed over the data transfer compensation time is changed to be higher.

15. The memory controller according to claim 14,
wherein the latency control timer includes:
an arithmetic circuit determining a data transfer compensation time, which is a time limit of data transfer performed by the bus master, based on a predetermined maximum latency of data transfer memorized in a maximum latency control table and the count value counted by the counter; and
a latency timer outputting a control signal to the arbiter when the waiting time of the bus master exceeds the data transfer compensation time, so that the priority order of the bus master passed over the data transfer compensation time is changed to be higher.

16. The memory controller according to claim 15,
further comprising a bus interface connected to the bus,
wherein the latency control timer totally controls the waiting times of the bus masters, of which connections between the bus interfaces are established.

17. The memory controller according to claim 15,
further comprising a bus interface connected to the bus,
wherein the latency control timer is provided for each bus interface.

18. A control method of an integrated circuit, the integrated circuit including a bus system including a bus master connected to a bus, and a memory controller connected to the bus system and controlling a connection between the bus master and a memory, the control method comprising:
counting a waiting time from a time the bus master sends an access request for the memory, until a time the connection between the bus master and the memory controller is established; and
controlling a memory access of the bus master based on the counted waiting time.

19. The control method of the integrated circuit according to claim 18,
wherein the bus system provides a first bus and a second bus connected hierarchically; and
a bridge controller between the first bus and the second bus, and controlling the connection between the first bus and the second bus, and
the control method further comprising:
counting a first waiting time from the time the bus master connected to the first bus sends the access request, until the time a connection between the bus master and the bridge controller through the first bus is established;
retrieving a count value held by the first counter as a default value;
counting a second waiting time from the time a connection between the bus master connected to the first bus and the bridge controller is established, until the time a connection between the bridge controller and the memory controller connected to the second bus is established;
calculating the waiting time from the time the bus master sends the access request for the memory, until the time the connection between the bus master and the memory controller is established with accumulating the first and the second waiting time; and
outputting the calculated waiting time to the memory controller.

20. The control method of the integrated circuit according to claim 18, further comprising:
determining a data transfer compensation time, which is a limit time for the bus master to transfer data, based on the counted waiting time and a maximum latency of data transfer, which is predetermined for each bus master; and
setting the connection between the bus master and the memory to be preferably established when the waiting time of the bus master exceeds the data transfer compensation time.

* * * * *